Aug. 12, 1969  H. M. KEATING  3,460,859
DUCT COUPLING FRAME AND CORNER MEMBER
Filed March 23, 1967
2 Sheets-Sheet 1
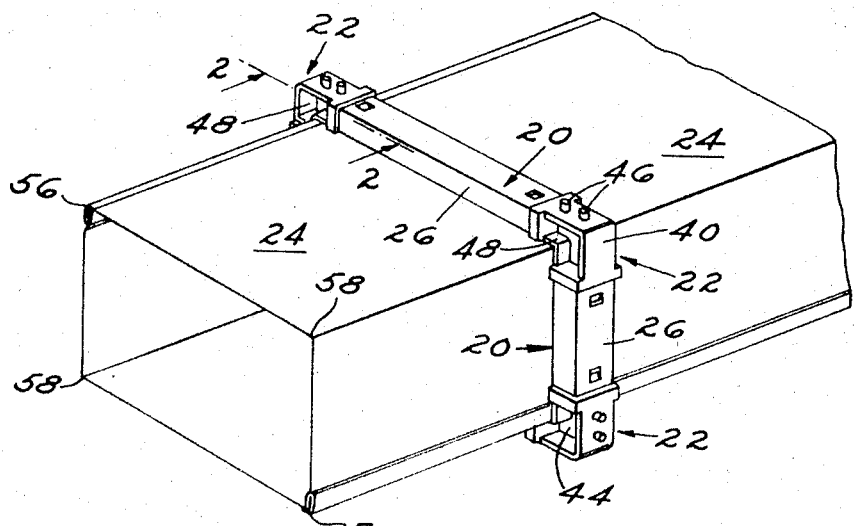
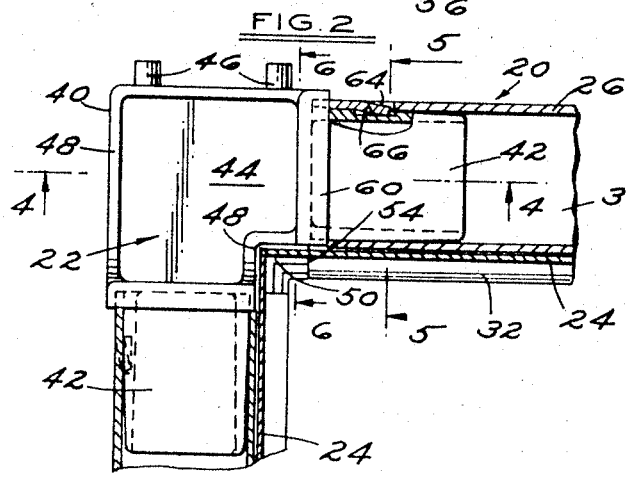
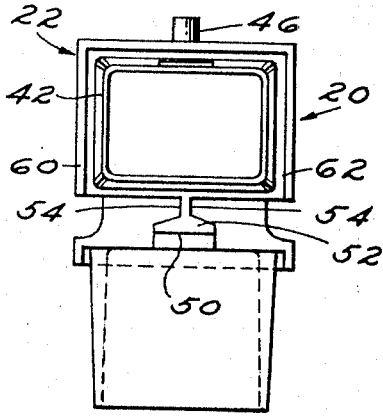
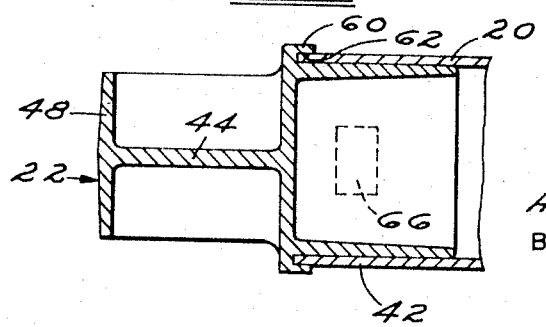
INVENTOR
HENRY M. KEATING
BY
Burton & Parker
ATTORNEYS Aug. 12, 1969  H. M. KEATING  3,460,859
DUCT COUPLING FRAME AND CORNER MEMBER
Filed March 23, 1967  2 Sheets-Sheet 2
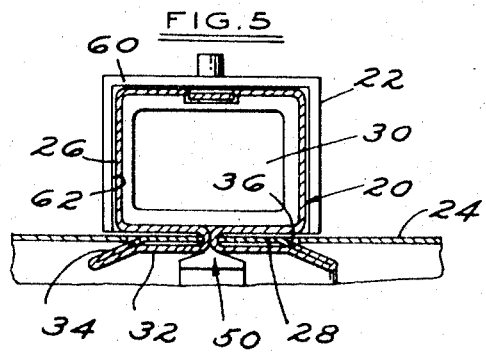
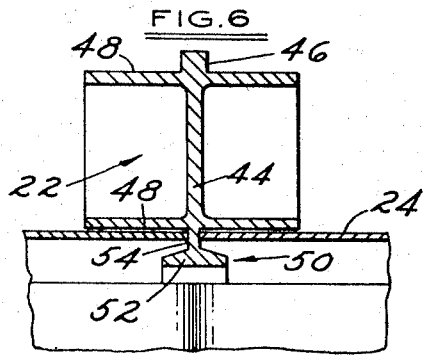
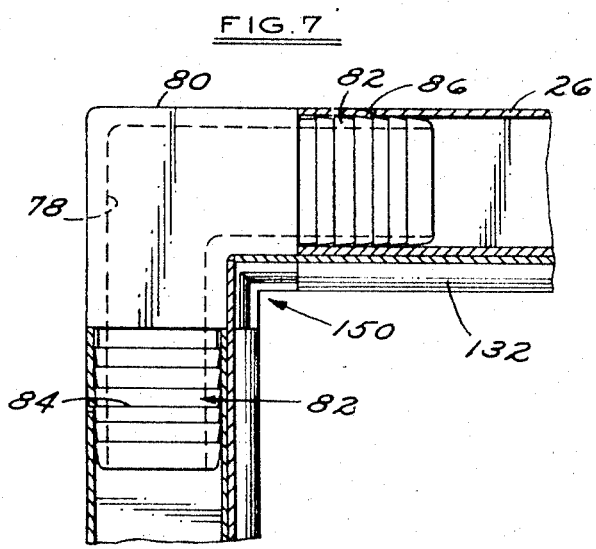
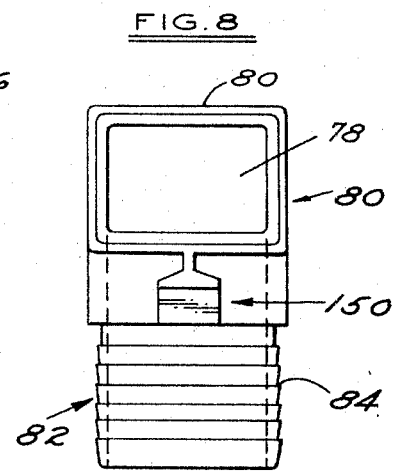
INVENTOR
*HENRY M. KEATING*
BY
*Burton E. Parker*
ATTORNEYS United States Patent Office 3,460,859
Patented Aug. 12, 1969

3,460,859
DUCT COUPLING FRAME AND CORNER MEMBER
Henry M. Keating, 18945 Gilchrist, Detroit, Mich. 48235
Continuation-in-part of application Ser. No. 470,374, July 8, 1965. This application Mar. 23, 1967, Ser. No. 625,390
Int. Cl. F16l 55/00, 25/00
U.S. Cl. 285—319  9 Claims

ABSTRACT OF THE DISCLOSURE

In general, this disclosure relates to a coupling frame for ventilation ducts, including a plurality of channel sections joined by corner members. The coupling frame is received between and joins opposed ends of the duct sections, and may be utilized to support the duct system.

This application is a continuation in-part of my copending application for patent, Ser. No. 470,374, and now Patent No. 3,415,543.

This invention relates to a novel and improved coupling frame which provides for quick forming of joints between adjacent duct sections. The invention is particularly, although not exclusively, adapted for use in joining high pressure industrial duct sections and supporting the duct system.

Previous coupling frames of the type disclosed herein may be divided into two general categories: coupling frames which required bolting or riveting as shown by U.S. Patent 596,817, and the "snap-in" coupling frames as shown by U.S. Patents 565,499 and 2,498,753. The latter type of coupling frame provides several advantages over the bolted or riveted sections, especially in high pressure systems. Previous "snap-in" structures of this type, however, were designed with the duct-end receiving channels at the radial outer periphery of the frame, which required the corners of a rectangular frame, for example, to be open. Such structures are unacceptable in high pressure industrial use, because of the loss of pressure or vacuum and heat exchange losses at the corners. The coupling frame disclosed in my referenced copending application provided a continuous channel, which sealed the duct about its entire periphery, thus eliminating heat and pressure loss at the corners.

Other frames of this "snap-in" prior art type were provided with tightly flattened portions overlying the inside of the duct sections. Such structures are not sufficiently resilient to allow for expansion or contraction, or to join misaligned sections, and allows heat exchange losses at the joint. The hollow rectangular cross section of the coupling frame shown by my referenced copending application allowed the channels to resiliently yield to join misaligned sections, and the sealed chamber insulated the joint against heat exchange and pressure loss.

U.S. Patent No. 3,199,901, illustrates one form of a corner member for a bolted or riveted coupling frame, as described herein, and U.S. Patents 2,861,659, 2,897,927, and 3,034,612 illustrate various forms of corner members for prefabricated structures.

The coupling frame of this invention comprises a plurality of channel-shaped sections having a generally rectangular hollow outer frame portion adapted to overlie the opposed ends of the duct sections to be joined, and a plurality of corner members having a pair of angularly related arm portions received within the opposed ends of the hollow outer frame of the channel-shaped sections. The channel-shaped sections have a pair of reversely folded legs at their longitudinal inner ends defining opposed duct-end receiving channels. The rectangular hollow outer frame of the channel-shaped sections define a chamber in communication with the interior of the duct system, and the corner members seal the chambers against loss of heat or pressure. The hollow rectangular cross section of the channel allows the coupling frame to compensate for expansion and contraction of the duct system, and permits joining of misaligned duct sections.

The corner member may be provided with a lip portion which overlies the arm portions to define a recess which receives the ends of the rectangular hollow outer frame, thereby stabilizing the frame structure and permitting the duct system to be supported at the corners. An integral stop means may be provided on the body portion of the corner member, which extends from the body portion between the angularly related arm portions. Such angularly related portions may be of channel shape in cross section. The stop means is adapted to retain sealing means in the duct corners, and extends in the completed joint, between the duct corners to prevent loss of sealant through the duct system.

According to one embodiment of the corner member of this invention, the arm portions extend generally at right angles, and the body portion has a central web portion joining the channel portions, which is adapted to be received over a corner of the duct sections. An integral rivet means may be provided for supporting the ducts from a structural member in the axis of the central web portion to prevent collapse of the corner member during riveting. In this embodiment, the body portion has a reinforcing flange extending from the central web adapted to support other structural members from the duct system.

FIGURE 1 is a side elevation of one embodiment of the duct coupling frame of this invention;

FIGURE 2 is a partial cross sectional view of the embodiment shown in FIGURE 1, in the direction of view arrows 2—2;

FIGURE 3 is an end view of the corner member embodiment shown in FIGURE 2;

FIGURE 4 is a cross sectional view of the embodiment shown in FIGURE 2, in the direction of view arrows 4—4;

FIGURE 5 is a cross sectional view of the embodiment shown in FIGURE 2, in the direction of view arrows 5—5;

FIGURE 6 is a cross sectional view of the embodiment shown in FIGURE 2, in the direction of view arrows 6—6;

FIGURE 7 is a partial cross sectional view of another embodiment of the corner member of this invention; and FIGURE 8 is an end view of the embodiment shown in FIGURE 7.

In the embodiment of my invention shown in FIGURES 1 to 6, the coupling frame includes four channel-shaped sections 20, and four corner members 22; joining two conventional rectangular duct sections 24. The channel-shaped sections 20 are more fully described in my above referenced copending application for patent, and include a generally rectangular hollow frame section 26 which overlies the adjoining duct section ends 28, as shown in FIGURE 5. The hollow outer frame 26 defines a chamber 30 in communication with the interior of the duct section, and includes a pair of reversely folded legs 32 which receive the opposed ends of the duct sections 28. In the embodiment shown in FIGURE 5, the distal ends 34 of the legs are folded over to define laterally extending locking lips, which engage and retain locking tabs 36 struck from the ends of the duct section 28.

The corner members 22 have a body portion 40 and a pair of arm portions 42 extending at right angles therefrom. The arm or channel portions 42 are generally rectangular in cross section to be received in the ends of the rectangular hollow outer frame 26, and seal the chamber 30 as shown in FIGURE 2. The walls of the channel sections may be slightly tapered, as shown in FIGURES 2 and 4, to provide for ease of assembly and manufacture.

In the embodiments shown in FIGURES 1 to 6, the body portion 40 of the corner member has a central web portion 44, and a pair of integral rivets 46 defined in the axis of the central web portion. The rivets may be utilized to support the coupling frame from another structural member, and are defined in the axis of the central web 44, as shown in FIGURE 6, to provide the necessary structural rigidity to permit impacting of the rivets. The central web configuration of the corner member also provides an excellent strength to weight ratio in the assembled frame, as shown in FIGURE 1. The body portion in this embodiment is also provided with a peripheral flange 48 which adds rigidity to the structure, and provides a means for supporting other structural members from the duct system.

A stop means 50 is provided on the body portion for retaining sealant or caulking in the corners of the duct sections. The stop means 50 extends from the body portion, between the channel portions 42, and has an overlying lip portion 52 adapted to extend axially within the duct system, as shown in FIGURE 2. Sealant or caulking may be used in vacuum systems, or where pressure maintenance is critical. In such systems, caulking may be introduced in the channel defined by the reversely folded legs 32, as shown in FIGURE 5, and in the L-shaped channels 54 defined by the overhanging lip 52 of the stop means, as shown in FIGURE 2. The stop means 50 will retain the sealant in the corner of the duct sections, and prevent the sealant from being blown through the ducts. The width of the duct sections, at the corners, will vary considerably depending upon the type of joint utilized to form the duct. For example, the duct sections shown in FIGURE 1 has two "Pittsburgh-type" corners 56, which are considerably wider than the folded corners 58. The L-shaped channels 54 of the stop means are wide enough to accommodate either the Pittsburgh duct corners 56, or the folded corners 58.

The body portion of the corner member, in this embodiment, is provided with a lip portion 60 which overlies the channel portions 42 and defines a recess 62 which receives the end of the frame 26. The end of the frame 26 is retained in the recess 62 by a tab 64 struck from the outer frame 26 adjacent the end as shown in FIGURE 2, which is received in a recess 66 defined in the channel portion. The entrapment of the end of the hollow outer frame 26 of the channel section in the recess 62 provides torsional rigidity to the coupling frame, without limiting the desirable flexibility or adaptability of the coupling frame of my invention.

Conventional high pressure duct joints require a flange or lip of approximately one inch on the ends of the duct sections, which were bolted to the flange of the adjoining ducts, or to a frame means. A seal, such as a strip of neoprene or asbestos, is generally provided between the flanges. This joint is difficult to secure, especially in large duct systems where the access is limited, and the flanges must be accurately aligned to insure a properly sealed joint. Further, the flanges or lips at the end of the duct sections often become damaged out of alignment, so that they must be straightened before use or discarded. Another problem with commercial duct systems is the "pile-up" of length variations caused by forming the flanges or lips on the ends of the ducts. This becomes an important factor in long industrial duct systems.

In the duct system of this invention, the ducts do not require a flange or lip at the end of the duct sections, and the spacing between the ducts is approximately one quarter inch, which may be accurately controlled to prevent "pile-up" of length variations, and sections of one-quarter inch less than existing stock may easily be supplied to form sections in even feet. The duct system of this invention also provides the resiliency necessary to join rigid duct sections which are not accurately aligned, yet provide the necessary rigidity to support long duct systems. Further, the coupling frame of this invention provides a sealed chamber 30 in the hollow outer frame 26, in communication with the interior of the duct system. This provides an excellent seal and insulation for the duct system.

In the embodiment of the corner member shown in FIGURES 7 and 8, the corner member provides sealed communication between the adjoining hollow frame sections, through a passage 78 defined in the body portion 80. The channel portions 82 are provided with radial teeth 84 which engage the inner wall of the hollow outer frame 26 of the channel-shaped sections to provide a seal, and aid in the retention of the corner in the frame sections. A tab 86 may be struck from the outer frame 26, as shown in FIGURE 7, to secure the corner member in place.

The corner member, of this embodiment, is provided with an integral stop 150, similar to the stop 50 of the embodiment in FIGURES 1 to 6, to retain sealant in the corners of the duct sections. The function and utilization of the corner member of FIGURES 7 and 8 is similar to that of the embodiment shown in FIGURES 1 to 6, and therefore need not be described in detail.

Various materials may be used for the coupling frame elements, depending upon the type of duct sections to be joined, etc. The channel sections 20 may be formed from rolled sheet steel, for example, and the corner members 22 may be cast from aluminum or magnesium.

What is claimed is:

1. A duct coupling frame for receiving and joining duct sections, comprising: a plurality of channel-shaped sections having a generally rectangular hollow outer frame portion adapted to overlie the opposed ends of the duct sections to be joined defining a chamber, said channel-shaped sections having a pair of reversely folded legs at their longitudinal inner ends defining opposed duct-end receiving channels, and a plurality of corner members having a pair of angularly related arm portions received within the opposed ends of said hollow outer frame closing said frame chambers and a lip portion which overlies said corner member arm portions defining a recess receiving the ends of said rectangular hollow outer frame.

2. The duct coupling frame defined in claim 1, characterized in that said corner members have an integral stop means extending from the body portion of said corner members between said angularly related arm portions adapted to be received between the opposed corners of the duct sections to be joined to retain sealing means in the duct corners.

3. The duct coupling frame defined in claim 1, characterized in that said corner members have a central web portion joining said angularly related arm portions, and an integral rivet means extending from the body portion of said corner member in the axis of said central web portion for supporting the ducts from a structural member.

4. A corner member for a duct coupling having a hollow outer frame which overlies the opposed ends of the duct sections to be joined and a pair of reversely folded legs defining opposed duct-end receiving channels, said corner member comprising a body portion having a pair of angularly related arm portions configured to be received within opposed ends of the hollow outer frame of the duct coupling in sealing relation, said arm portions provided with means to restrain withdrawal of the opposed ends of the coupling frame, and a stop means extending from said body portion between said angularly related arm portions, said stop means including a lip portion overlying said body portion adapted to be received between the opposed corners of the duct sections to retain sealing means in the duct corners.

5. The duct coupling corner member defined in claim 4, characterized by said stop means having a lip portion overlying said body portion defining a generally L-shaped channel adapted to receive a corner of the duct section.

6. The duct coupling corner member defined in claim 5, characterized by said lip portion defining a pair of opposed L-shaped channels adapted to receive opposed corners of the duct sections.

7. The duct coupling corner member defined in claim 4, characterized by said body portion having a lip overlying said angularly related arm portions defining a recess which receives the end of the hollow outer frame of the duct coupling.

8. A corner member for a duct coupling having a generally rectangular hollow outer frame overlying opposed ends of the duct sections, comprising: a body portion having a pair of hollow channel portions extending therefrom generally at right angles, and a lip extending between and overlying said channel portions defining a recess adapted to receive the end of a generally rectangular outer frame of the duct coupling, said channel portions configured to be received within opposed ends of the rectangular hollow outer frame of the duct coupling, said body portion having a generally flat, L-shaped central web portion joining said channel portions adapted to be received over a corner of the duct sections having a reinforcing flange portion extending from said central web adapted to support other structural members, and an integral rivet means extending from said body portion in the axis of said central web portion for supporting the ducts from a structural member.

9. The corner member defined in claim 1, characterized in that said body portion has a stop means extending therefrom between said channel portions adapted to be received between the opposed corners of the duct sections to retain sealing means in the duct corners.

References Cited

UNITED STATES PATENTS

| | | | |
|---|---|---|---|
| 958,316 | 5/1910 | Rogers et al. | 287—54 |
| 1,678,350 | 7/1928 | Ott | 287—54 |
| 1,762,766 | 6/1930 | Garay | 285—398 X |
| 2,126,499 | 8/1938 | Petersen | 285—424 X |
| 2,498,753 | 2/1950 | Deitsch | 285—424 X |
| 2,861,659 | 11/1958 | Hagerty et al. | |
| 3,199,901 | 8/1965 | Jeppsson | 285—424 X |
| 2,501,638 | 3/1950 | Warren | 285—179 X |

FOREIGN PATENTS

| | | |
|---|---|---|
| 540,267 | 8/1955 | Belgium. |
| 652,666 | 9/1964 | Belgium. |
| 90,469 | 10/1895 | Germany. |
| 706,420 | 3/1931 | France. |

MARION PARSONS, Jr., Primary Examiner

D. W. AROLA, Assistant Examiner

U.S. Cl. X.R.

285—399, 424; 287—189; 248—62